M. JAKUBOWSKI.
TROLLEY.
APPLICATION FILED OCT. 25, 1911.
1,034,241.
Patented July 30, 1912.
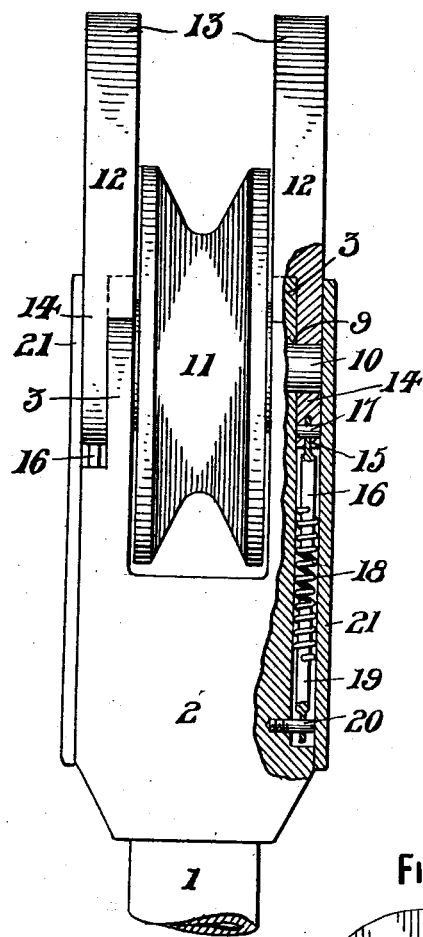
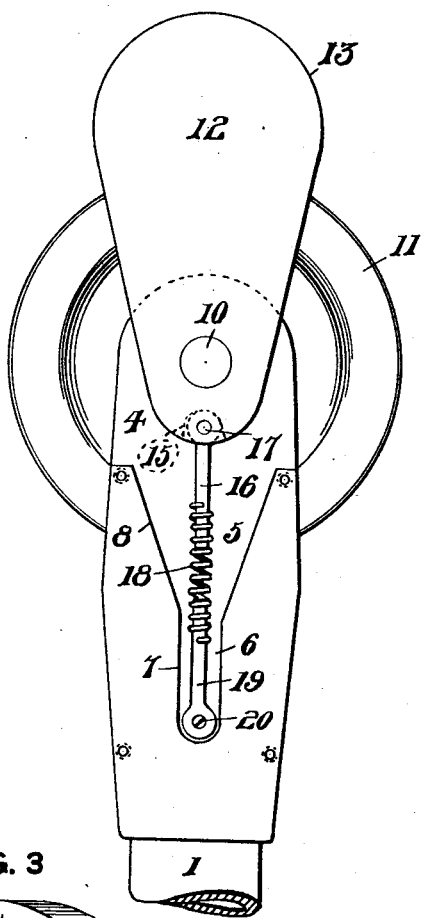
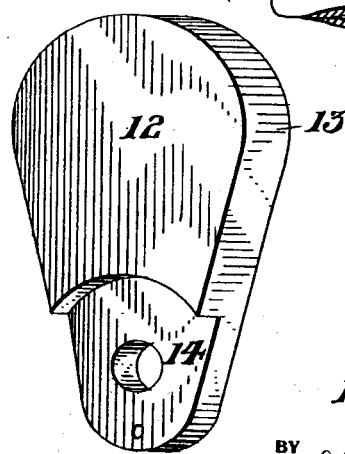
WITNESSES
J. P. Appleman
Ralph C. Evert.
INVENTOR
M. Jakubowski
BY
N. C. Evert & Co.
ATTORNEYS

UNITED STATES PATENT OFFICE.

MICHAL JAKUBOWSKI, OF WINDBER, PENNSYLVANIA.

TROLLEY.

1,034,241.  Specification of Letters Patent.  Patented July 30, 1912.

Application filed October 25, 1911. Serial No. 656,681.

*To all whom it may concern:*

Be it known that I, MICHAL JAKUBOWSKI, a subject of the Emperor of Austria-Hungary, residing at Windber, in the county of Somerset and State of Pennsylvania, have invented certain new and useful Improvements in Trolleys, of which the following is a specification, reference being had therein to the accompanying drawing.

This invention relates to trolleys, and the objects of my invention are, first, to furnish a trolley harp with novel means for preventing displacement of a trolley wire relatively to the trolley wheel of said harp; second, to provide a trolley wire retaining device that can be advantageously used in connection with high speed electric railways; third, to provide a trolley harp attachment of the above type that will not interfere with frogs or other over-head construction, and fourth, to accomplish the above results by a mechanical construction that is simple, durable and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a front elevation of a trolley harp partly broken away, and partly in section. Fig. 2 is a side elevation of the same with a side plate thereof removed, and Fig. 3 is a perspective view of a detached guard.

The reference numeral 1 denotes a portion of a pole having a harp 2 with oppositely disposed arms 3. The arms 3 have the outer sides thereof cut away, as at 4, 5 and 6, the cut away portions 5 and 6 forming a recess having vertical walls 7 and inclined walls 8.

The arms 3 are provided with alining openings 9 for a journal pin 10. Revolubly mounted upon the pin between the arms 3 is a trolley wheel 11 of the ordinary and well known type.

Pivotally mounted upon the outer ends of the pin 10 are guards 12 having the upper ends thereof rounded, as at 13. The lower ends of said guards have the inner sides thereof cut away, as at 14 to provide clearance for the arms 3 and the lower end of each guard has a recess 15 to accommodate the head of a coupling pin 16 that is pivotally retained within the recess 15 by a transverse pin 17. Attached to the coupling pin 16 is the upper convolution of a coiled retractile spring 18, said spring having the lower convolution thereof connected to a coupling pin 19 that is pivotally held by a screw or pin 20 extending into the harp 2. The cut away portions 5 and 6 provide clearance for the pins 16 and 19 and the spring 18, while the cut away portion 4 provides clearance for the lower end of the guards 12.

The lower ends of the guards are retained upon the ends of the pin 10 by side plates 21 riveted or otherwise connected to the outer sides of the arms 3, said side plates also retaining the coupling pins and springs within the arms and sides of the harp.

The guards 12 project above the upper edge of the wheel 11 and figuratively speaking, said guards increase the size of the groove of the trolley wheel. The guards present vertical walls over which it is practically impossible for a trolley wire to ride during a movement of the trolley harp. When obstructions are encountered by said guards the guards immediately yield to ride under the obstruction but are immediately restored to their vertical position through the medium of the coupling pins 16 and 19 and the spring 18 connecting said pins.

What I claim is:—

1. A trolley comprising a harp having the outer faces of its arms cut away to provide recesses, said arms having rounded top edges, a journal pin mounted in the upper portions of and projecting from the cut away portions of said arms, a trolley wheel revolubly mounted upon said pin between and projecting above said arms, guards pivotally mounted upon the projecting ends of said pin having their inner faces provided with curved bearing surfaces engaging the top edges of said arms, said guards projecting above said wheel, depending coupling pins having their upper ends pivotally connected in the lower ends of said guards centrally thereof and depending into said recesses, upwardly extending coupling pins arranged in said recesses and having their lower ends pivotally connected to said arms at the lower ends of said recesses, said upwardly extending coupling pins being spaced from said depending coupling pins, and coiled springs connecting the depending coupling pins to the upwardly extending coupling pins.

2. A trolley comprising a harp having the outer faces of its arms cut away to provide recesses and further having the top edges thereof rounded, a journal pin mounted in and projecting from the cut away portions of said arms near the top thereof, a trolley wheel revolubly mounted upon and projecting above said pin between said arms, guards pivotally mounted upon the projecting ends of said pin and having the inner faces thereof provided with curved bearing surfaces engaging the top edges of said arms, said guards projecting above said wheel, depending coupling pins having their upper ends pivotally connected in the lower ends of said guards centrally thereof, and depending into said recesses, upwardly extending coupling pins arranged in said recesses and having their lower ends pivotally connected to said arms at the lower end of said recesses, said upwardly extending coupling pins being spaced from said depending coupling pins, coiled springs connecting the depending coupling pins to the upwardly extending coupling pins, and side plates secured to said arms for closing said recesses.

In testimony whereof I affix my signature in the presence of two witnesses.

MICHAL JAKUBOWSKI.

Witnesses:
 CHAS. HELLBERG,
 HARRY W. YEHOGEN.

Copies of this patent may be obtained for five cents each, by addressing the "Commissioner of Patents, Washington, D. C."